United States Patent [19]

Deb et al.

[11] Patent Number: 4,983,202

[45] Date of Patent: Jan. 8, 1991

[54] GLASS SHEET HEATING FURNACE AND METHOD OF USING

[75] Inventors: Sugato Deb, Perrysburg; John C. Hovis, Elmore, both of Ohio; Michael L. Pollock, Petersburg, Mich.

[73] Assignee: Libbey-Owens-Ford Co., Toledo, Ohio

[21] Appl. No.: 485,643

[22] Filed: Feb. 27, 1990

[51] Int. Cl.$^5$ ............................................. C03B 23/02
[52] U.S. Cl. ...................................... 65/104; 65/106; 65/118; 65/273; 65/289; 65/356
[58] Field of Search ................. 65/102, 103, 106, 273, 65/118, 119, 289, 104, 291, 241, 245, 356

[56] References Cited

U.S. PATENT DOCUMENTS

| | | | |
|---|---|---|---|
| 3,008,270 | 11/1961 | Hohmann et al. | 65/287 X |
| 3,162,520 | 12/1964 | Robinson | 65/287 X |
| 3,298,810 | 1/1967 | McKelvey | 65/287 X |
| 3,307,930 | 3/1967 | Stevens et al. | 65/290 X |
| 3,356,480 | 12/1967 | Golightly | 65/288 X |
| 4,341,546 | 7/1982 | Nitschke et al. | 65/273 X |
| 4,390,358 | 6/1983 | Frielingsdorf | 65/119 X |
| 4,416,679 | 11/1983 | Frielingsdorf | 65/119 X |
| 4,561,374 | 5/1986 | Klemola | 65/356 X |
| 4,608,073 | 8/1986 | Ford et al. | 65/273 X |

*Primary Examiner*—Robert L. Lindsay
*Attorney, Agent, or Firm*—Marshall & Melhorn

[57] ABSTRACT

The invention comprises a tunnel-type heating furnace of modular construction for heating glass sheets carried therethrough in succession on a series of aligned rollers. The furnace enclosure includes a lower section of generally rectangular cross-section beneath the rollers and an upper section, which is of generally elliptical configuration in cross-section, above the rollers. The upper enclosure section is vertically retractable by means of a jack mechanism to facilitate maintenance and changing of the rollers. The rollers include shafts at their opposite ends having bearings adapted to be received and supported in upwardly opening recesses in roll support plates extending along either side of the furnace. A toothed gear or sprocket is affixed to the end shaft at one end of each roller. The rollers are driven in groups by timing belts whose upper flights extend over and engage the toothed gears. Hold down assemblies removably carried by the roll support plates include cam rollers positioned intermediate each pair of toothed gears for urging the timing belts downwardly into driving engagement with the toothed gears. A differential heating assembly may be provided for modifying the heating pattern beneath the elliptical upper enclosure section.

23 Claims, 4 Drawing Sheets

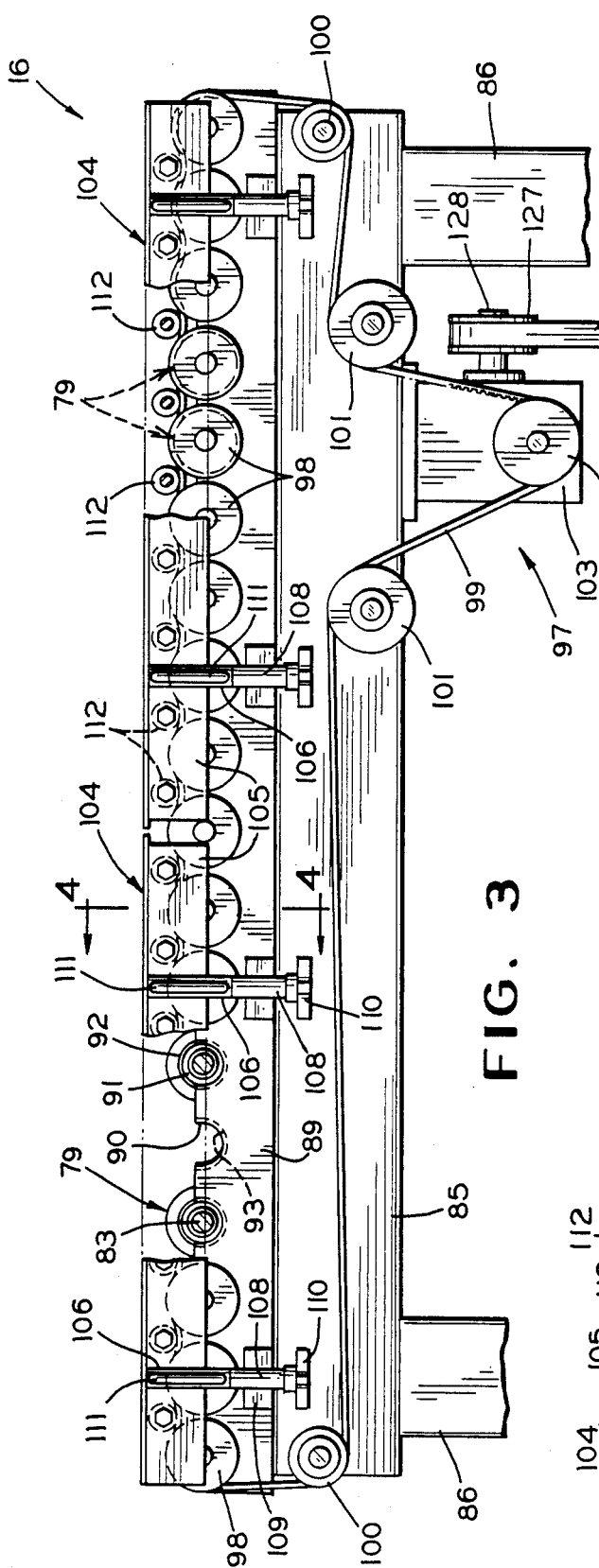
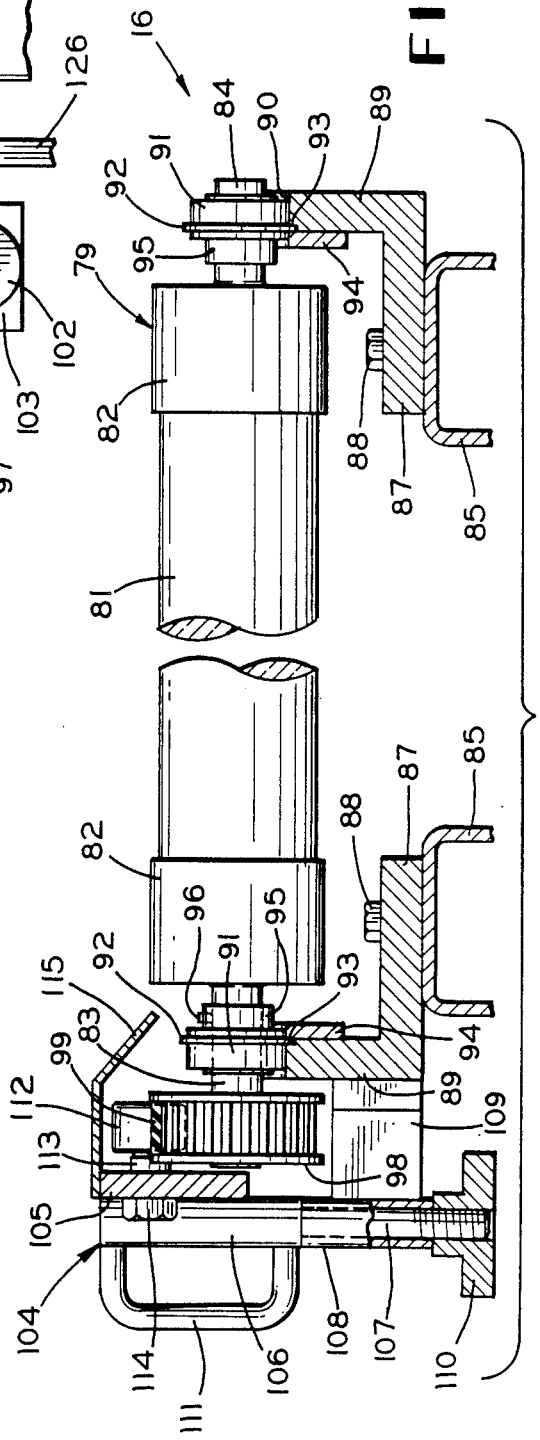

GLASS SHEET HEATING FURNACE AND METHOD OF USING

BACKGROUND OF THE INVENTION

1. Field of the Invention

The present invention relates to glass sheet heating furnaces of the elongated tunnel-type, wherein glass sheets are heated as they are conveyed therethrough upon a series of aligned rollers in preparation for subsequent treatment steps such as bending, tempering and annealing. More particularly, the invention pertains to such furnaces incorporating improved glass sheet heating and conveying means.

2. Description of the Prior Art

Glass sheets for use in the automotive industry are typically heated to their softening point, and then bent to a prescribed configuration dictated by the design of the automobile in which they are to be installed. After bending, the sheets which are to be employed as side lites and back lites are typically subjected to rapid chilling so as to develop a desired degree of temper for producing an acceptable break pattern. Sheets which are to be employed as windshields are gradually cooled so as to be annealed, and then laminated to another sheet or sheets in various combinations by means of a plastic interlayer.

Early glass sheet heating furnaces generally comprised an elongated refractory chamber of rectangular cross section through which the sheets were conveyed in succession upon a series of spaced metallic rolls. Heat was provided by suitable gas or electric heating elements positioned in the roof and side walls to, in turn, heat the interior of the furnace. The walls and roof were stationary members built up of refractory blocks. The rolls extended across the furnace and were supported in journals located outside the side walls. A worm gear affixed to one end of each roll drivingly engaged a worm wheel on a drive shaft running along and mounted for rotation adjacent a side wall of the furnace. Such conveyor systems, while being mechanically sound, were relatively expensive to build and maintain, and did not readily admit changing of individual rolls should that be necessary. In addition, the furnaces were not readily adapted to producing individualized heating patterns for glass sheets having different configurations and requiring different thermal characteristics.

Rolls having ceramic glass contacting surfaces were found to have significant advantages over metallic rolls in the conveying of the sheets through the furnace. Initially, the ceramic rolls were mounted and driven in a manner similar to the metallic rolls. However, it was found that such rolls more frequently require refurbishing to maintain their glass-contacting surface in a suitable condition, so that it is occasionally necessary to remove and replace individual rolls or groups of rolls. This was very difficult and time consuming with the worm wheel and line shaft drive system, resulting in extended periods of lost production. In order to facilitate changing of the rolls, so-called friction drive systems were devised wherein the rolls rest at each end, outside the furnace enclosure, upon longitudinally extending belts. The ends of the rolls are restrained against longitudinal movement so that as the flights of the belts upon which the rolls rest are advanced, the rolls are driven in rotation. Changing of rolls and access to the furnace interior was further improved by the development of furnaces whose upper sections, that is, the portion above the roll line, comprises a vertically retractable assembly. In order to, among other things, improve heating efficiency and temperature control, it has been proposed to construct such furnaces in which either or both the lower and upper sections are of semi-cylindrical configuration in cross-section.

SUMMARY OF THE INVENTION

In accordance with the present invention, there is provided a glass sheet heating furnace comprising a sectional or modular elongated tunnel-type enclosure through which individual glass sheets are carried in succession upon a series of aligned rollers. The furnace enclosure includes a lower section generally rectangular in cross-section, and an upper section whose interior surface facing the glass sheets travelling through the furnace is of a generally elliptical configuration in cross-section. While the lower section is illustrated and described herein as being of rectangular cross-section, as will be readily appreciated it may be of other and different configurations in cross-section. The aligned rollers are positioned at the juncture of the upper and lower furnace sections, and the upper section is vertically retractable by a jack mechanism for providing access to the rollers and the furnace interior.

The rollers are of ceramic material and are provided at their opposite ends with end caps including shafts having bearings adapted to be received in upwardly opening recesses in roll support plates extending along either side of the furnace. At one end each roll has a toothed gear or sprocket affixed to the end shaft. The rolls are driven in groups by means of timing belts whose upper flights extend over and engage the toothed gears. Hold-down assemblies removably carried by the roll support plates include cam rollers positioned intermediate each pair of adjacent toothed gears for urging the timing belts downwardly into driving engagement with the toothed gears. Individual rollers can be removed and replaced by raising the upper furnace section, removing the appropriate hold down assembly to disengage the timing belt, lifting the roller to disengage the end bearings from the recesses in the side support plates, and withdrawing the roller and inserting another in its place.

In accordance with another aspect of the invention, provision is made for selectively varying the heating pattern across the furnace. To that end, a differential heating assembly may be provided above the roller conveyor beneath the elliptically shaped upper section of the furnace enclosure.

BRIEF DESCRIPTION OF THE DRAWINGS

In the drawings, wherein like numerals are employed to designate like parts throughout:

FIG. 3 is an enlarged, fragmentary side elevational view of a portion of the roller mounting and drive mechanism of the invention;

FIG. 4 is an enlarged, transverse view of the roller conveyor, partially in section, taken substantially along line 4—4 of FIG. 3;

DESCRIPTION OF THE PREFERRED EMBODIMENTS

Figure 1:
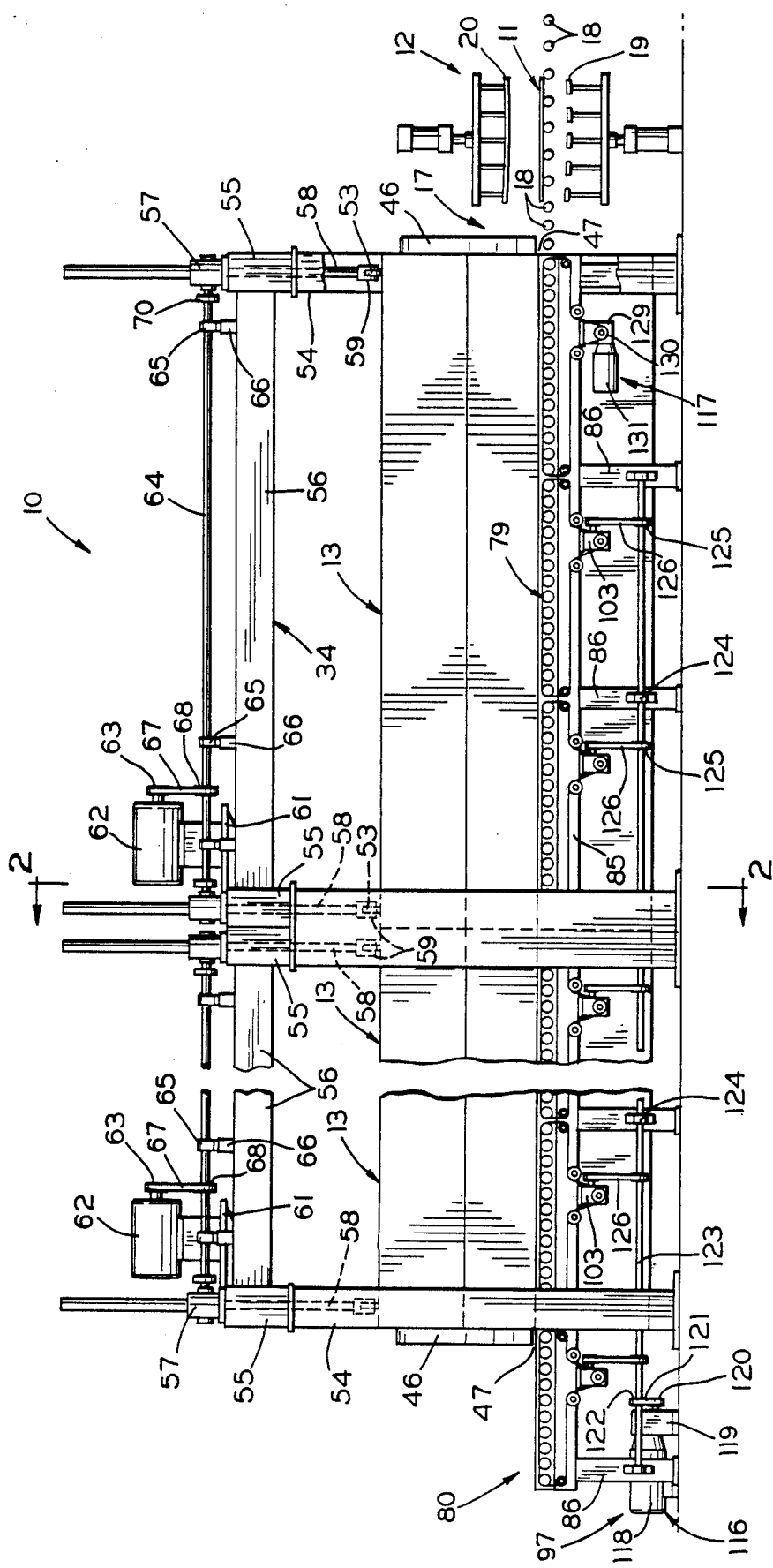
FIG. 1 is a schematic, longitudinal, elevational view of a glass sheet heating furnace constructed in accordance with the invention.

Referring now to the drawings, and in particular to FIG. 1, there is identified generally at 10 a heating furnace in accordance with the invention for delivering suitable heated glass sheets 11 to an adjacent press bending apparatus 12 or other apparatus (not shown) for bending and/or tempering the heated sheets. The heating furnace is formed of a series of individual modular sections 13 arranged in end-to-end relationship for forming the tunnel type enclosure. It is contemplated that each modular section may be on the order of three to eighteen feet or greater in length. Typically, four such modular sections, each on the order of eighteen feet in length, may be employed, although as will be readily apparent the number will be dependent upon a number of factors such as the length of each module and various operating requirements for the furnace.

Figure 2:
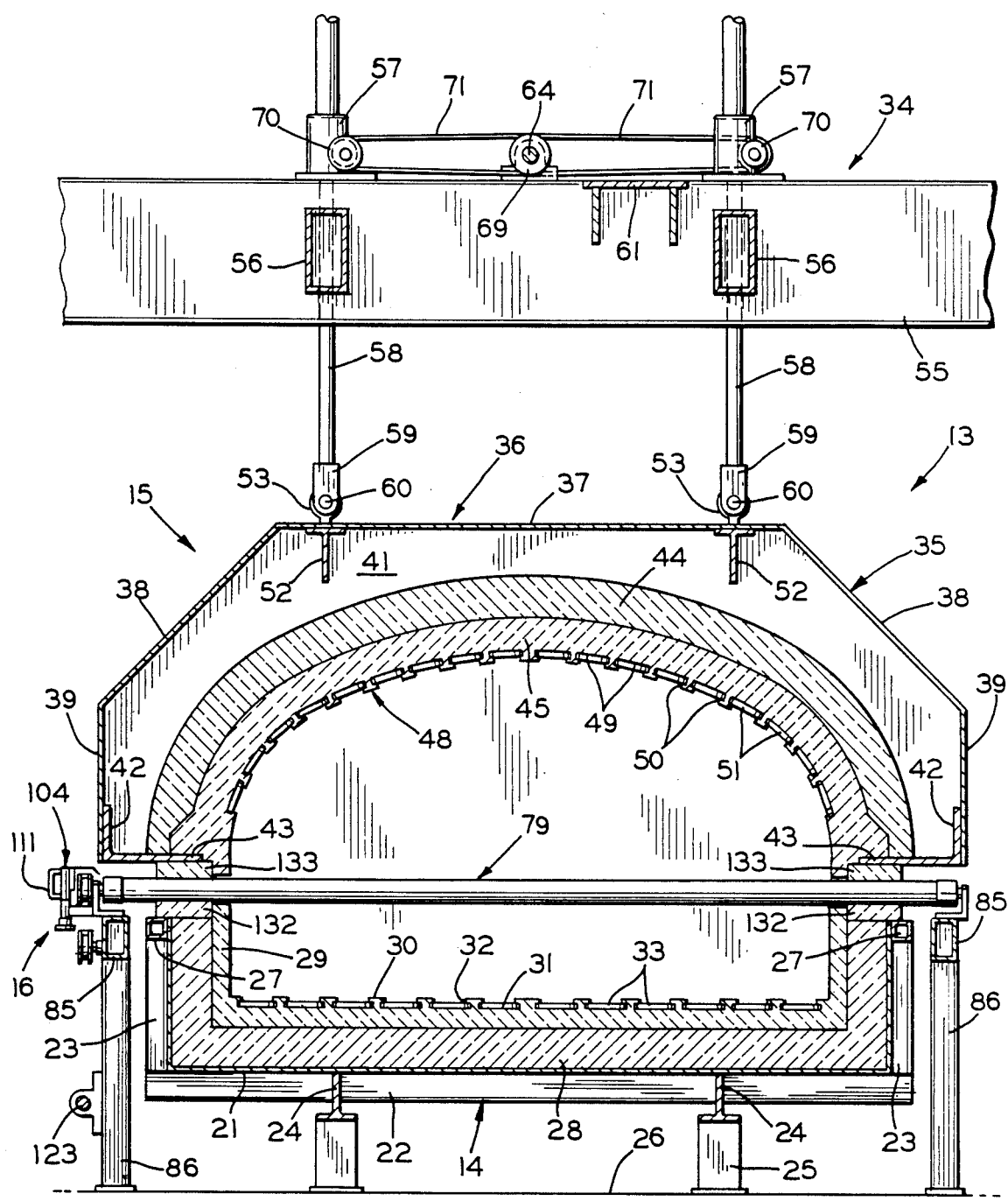
FIG. 2 is a transverse sectional view, taken substantially along line 2—2 of FIG. 1.

As best seen in FIG. 2, each modular section 13 comprises a lower enclosure section 14, an independently supported upper enclosure section 15, and a conveyor section 16 for transporting glass sheets into and through the furnace. At the exit end 17 of the furnace, the sheets 11 are received upon a series of conveyor rolls 18 by which they are carried into the press bending apparatus 12. A lower, segmented female pressing ring 19 lifts the sheets from the conveyor rolls and presses them against an upper male pressing surface 20 in the conventional manner, and then deposits the bent and shaped sheets upon the conveyor rolls for advancement out of the press bending station.

The lower enclosure section 14 comprises a metallic casing 21 carried within a structural framework including cross members 22 and vertical side braces 23. The cross members and casing are supported upon longitudinal beams 24 carried by pedestals 25 resting upon a supporting surface 26 such as a building floor. Tubular longitudinal bracing members 27 are provided along the tops of the side braces 23. The casing 21 is provided with a suitable insulating layer 28, and a refractory lining 29 covers the insulating layer and defines the interior surface of the enclosure. The upper surface 30 of the bottom wall of the refractory lining may be provided with longitudinally extending recesses 31 having throat sections 32 of reduced width. Elongated electric resistance strip heating elements 33 are mounted within the recesses for providing heat within the enclosure beneath the conveyor.

As hereinbefore indicated, the upper enclosure sections 15 of the furnace are mounted for movement between a lowered, operating position as shown in the drawings, and a raised, access position (not shown). To that end, the upper enclosure sections 15 are suspended from a free standing framework, shown generally at 34, supported upon the floor 26. Each unit or module of the enclosure section comprises an outer casement 35 serving as a framework for the section. As will be hereinafter described, an important aspect of the invention is the novel configuration of the section defining the interior cap or roof of the upper enclosure section, that is, the shape of the surface facing the glass sheets as they advance through the furnace on the conveyor 16. While the shape of this interior surface will be dictated by certain parameters of the invention, the exterior configuration of the casement 35 may take such form as will suitably provide economical structural integrity for the enclosure section. Thus, in a preferred embodiment illustrated in FIG. 2, the casement 35 comprises an external shell 36 formed of a top cover plate 37, angled corner plates 38 and oppositely disposed vertical side plates 39. Stiffener rib sections 41 are affixed to the cover plate 37 by rib sections 41 at intervals spaced longitudinally therealong.

Angle-shaped support members 42 having inwardly directed horizontal legs 43 are affixed along the lower extremities of the casement 35. A layer 44 of insulating material is disposed along and above a refractory cap or arch 45 positioned beneath the shell 36. The arch shaped layer 44 and cap 45 are supported at their lower edges upon the horizontal leg 43 of the member 42. A wall 46 at each end of the furnace (FIG. 1) encloses the upper enclosure section 15 above the conveyor. A suitable gap 47 is provided between the wall and the conveyor for permitting passage of the sheets 11 into and out of the furnace on the conveyor.

The refractory cap includes an exposed surface 48 facing the interior of the furnace and, in particular, the glass sheets as they move through the furnace on the conveyor 16. There may be formed in the surface a plurality of spaced, longitudinally extending recesses 49 having throat sections 50 of reduced width for receiving and retaining elongated electric resistance strip heating elements 51. The heating elements are connected to a source of electrical energy (not shown) in the conventional manner for providing heat to the furnace chamber as will be described.

In order to suspend the casement 35 from the supporting framework 34, there is affixed beneath the top cover plate 37 longitudinally extending braces 52. Lift rings 53 are provided above the braces at selected locations along the modular sections 13. Such rings may, for example, be located adjacent each end of each modular section 13 as in the embodiment illustrated in FIG. 1, for enabling raising of each module section independently of the others. Alternatively, where the modular sections are interconnected in the assembled furnace for simultaneous retraction, the lift rings 53 may be located intermediate the ends to reduce the required number of lifting jacks.

As shown in FIGS. 1 and 2, the supporting framework 34 for the upper enclosure section includes vertical columns 54 supported upon the floor 26 on either side of the furnace. Cross beams 55 extending over the furnace are supported at their opposite ends upon the columns. The cross beams 55 are interconnected by spaced longitudinal bracing members 56. Screw jacks 57 carried by the beams 55 and positioned above the lift rings 53, have extensible lift rods 58 vertically aligned with the lift rings 53. The lift rods are connected at their lower ends by means of clevises 59 and pins 60 to the lift rings. Thus, by appropriately operating the screw jacks to retract or extend the lift rods, the upper enclosure section can be raised and lowered.

Drive means is provided for operating a number of the screw jacks in unison to insure that the upper enclosure section or sections do not become skewed as they are raised and lowered. The furnace has been illustrated in FIG. 1, and will be described herein, as including separate drive means for lifting each modular section 13. However it will be understood, and it is fully contemplated, that a single drive means may operate all of the screw jacks for raising and lowering the entire upper enclosure section 15 as a unit.

More particularly, there is mounted on a base 61 affixed to a cross beam 55 above the upper enclosure section, a reversible motor-driven gear reduction unit 62 having an output drive pulley 63. A countershaft 64 mounted in bearings 65 carried by cross members 66 affixed to the longitudinal bracing members 56, extends longitudinally intermediate opposed pairs of the screw jacks. A suitable belt or chain 67 drivingly connects the output drive pulley 63 to a pulley 68 affixed to the countershaft 64 for driving the countershaft. Pulleys or gears 69 appropriately positioned along the countershaft are, in turn, drivingly coupled to like pulleys or gears 70 on the input shafts of the screw jacks 57 by belts or chains 71. Thus, by operating the unit 62 in the appropriate direction, all of the screw jacks 57 coupled to the countershaft 64 will be simultaneously driven to raise or lower the associated upper enclosure section.

In accordance with the invention, the interior surface of the upper enclosure section, that is, the roof facing the glass sheets as they are carried through the furnace on the conveyor, is of a novel configuration. Heretofore, such furnaces have generally been constructed for the purpose of providing uniform heating of glass sheets across the width of the furnace. To that end, early furnaces were constructed with flat roofs located some distance above the path of the glass sheets therethrough. Thereafter, furnaces were proposed having flat roofs located closer to the glass, and with radiant heating elements incorporated in the roof for heating the sheets. Still other furnace designs have been proposed employing a roof which is semi-circular in cross-section, and which may have radiant heating elements incorporated therein or used in conjunction therewith.

The configuration of the refractory roof facing the glass sheets as they travel through the furnace has a direct correlation to the pattern by which heat is imparted to the sheets. Thus, the heated refractory itself radiates heat to the sheets in addition to that applied directly from heating units within the furnace. Where the heating elements are incorporated into or follow the contour of the refractory roof, the configuration is of particular significance. Thus, the distribution of heat received by the glass in such furnaces is a function of the furnace cross-sectional shape.

The intention heretofore in furnace design has generally been to utilize the furnace to heat the glass passing therethrough uniformly from side to side across the furnace. Should any variation in the temperature profile across the sheet be desired, it was created by means of so-called differential heaters positioned to apply additional heat directly to specific areas as necessary. In producing present day bent glass units, it has been found desirable in many instances for the glass sheets to have temperature profiles varying according to a predetermined pattern as they exit the heating furnace in order to facilitate bending. While this temperature variation may be created by means of differential heaters, it has been found advantageous in accordance with the present invention for the furnace itself in certain instances to be capable of creating a non-uniform temperature profile in the sheets. Should modification of the furnace-produced temperature profile be desired, it can then be accomplished by means of differential heaters.

It is known that due to the fact that a heater in a flat furnace roof will radiate the maximum amount of heat to the glass directly beneath it, the flat configuration is relatively ineffective in distributing heat uniformly. Thus, in order to achieve a specific temperature profile, a significant variation in the power requirement to the individual heaters across the cross-section of the furnace is required. Creating and maintaining the necessary variation in watt density undesirably complicates the heater power controls and reduces the available choices in heater selection. In that regard, a roof of semicircular configuration is most effective in distributing heat uniformly from the heaters. It has been found, in fact, that the semi-circular or semi-cylindrical roof configuration is so effective in distributing heat uniformly to the sheets that the furnace is effectively incapable of differentially heating the sheets regardless of variation of energy radiated by the heating elements.

Figure 5:
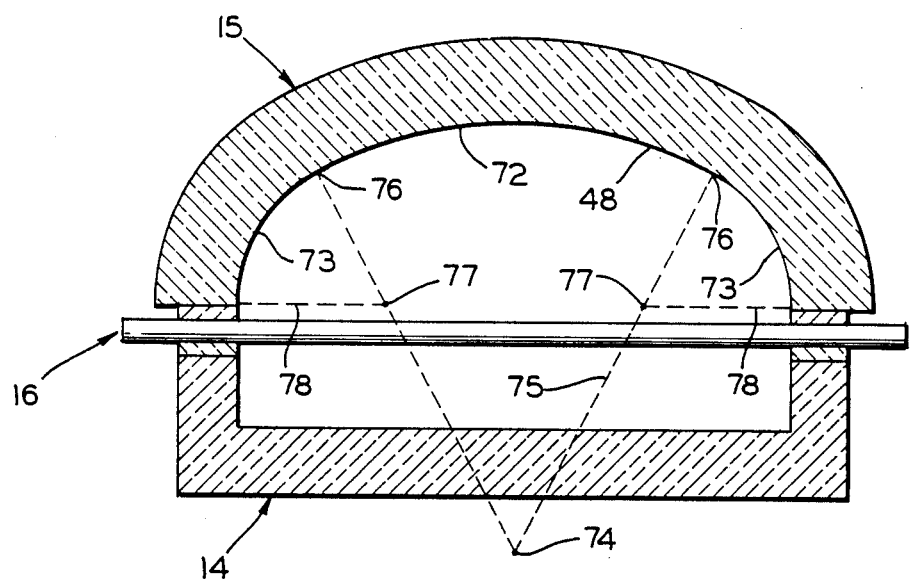
FIG 5 is a schematic, transverse, elevational view illustrating the configuration of the furnace enclosure.

In accordance with the present invention, it has been determined that a furnace roof or arch as illustrated in FIGS. 2 and 5, having an elliptical configuration in cross-section, is advantageous in relatively uniformly distributing heat from the heating elements while simultaneously enabling application of heat differentially across the furnace. Thus, the elliptical roof configuration provides relatively uniform heating in the central region, and allows differential heating of the glass along the side regions of the furnace. For clarity of illustration, the lower and upper enclosure sections 14 and 15, respectively have been shown in FIG. 5 without the heaters which would normally be associated therewith. However, it will be understood that appropriate heaters such as the heating elements 51 shown in FIG. 2 would be positioned to follow the novel contour of the surface 48 of the refractory cap 45.

The surface 48 is of elliptical configuration, defined by an intermediate arcuate segment 72 having a relatively large radius of curvature, and arcuate segments 73 along either side having smaller radii of curvature. More particularly, the surface may comprise the segment 72 defined by a circular arc generated from a center 74 and having a radius as shown at 75, which for a standard ellipse, is tangent at its extremities 76 with the segments 73 defined by circular arcs generated from centers 77 and having radii as shown at 78.

The width of the arch, the distance of the midpoint of the arcuate segment 72 above the glass path and the radii 75 and 78 of the arcuate segments 72 and 73, respectively are, of course, interrelated and the setting of any two of the dimensions will fix the others. The dimensions while a standard elliptical surface is preferable from a performance standpoint, a non-standard elliptical surface may also be utilized, in which care the arcs would not be tangent at their junctures, will be suitably selected upon the basis of a number of factors including the maximum watt density available in heating elements, minimum furnace height dictated by production requirements for heater replacement, glass pile up and installation of auxiliary equipment, and economy of construction. By way of example, a preferred embodiment in a furnace having an interior width of 84 inches (213.36 cm) between the sides, has a center height above the base of the refractory cap 45, that is above the horizontal legs 43 of the support members 42, of 25 inches (63.50 cm). The radius 75 is 64.396 inches (163.57 cm) and the radius 78 is 18.547 inches (47.11 cm).

With reference now particularly to FIGS. 3 and 4, the conveyor 16 of the invention comprises a plurality of spaced individual rollers 79, longitudinally aligned and positioned between the lower and upper enclosure sections 14 and 15 so as to carry individual glass sheets from a loading station 80 at the entrance to the furnace 10, into and through the furnace for transfer to the rolls 18, by which they are carried into the press bending apparatus 12. Such rollers for present day furnaces, as hereinabove described, generally have a ceramic work contacting surface and may be fabricated as of fused silica or quartz. Consequently, it may be necessary to periodically remove and replace individual rollers. The novel roll mounting and drive system of the invention is particularly adapted to provide a positive interrelated drive for the entire gallery of rollers, while facilitating rapid removal and replacement of selected individual rollers as becomes necessary.

To that end, the rollers 79 may comprise ceramic cylinders 81 having end caps 82 affixed thereto as disclosed, for example, in U.S. Pat. No. 3,867,748 to Miller. The end cap at one end of the roller includes a drive axle 83 and the end cap at the other end includes a mounting shaft 84. In order to support the rollers, there is provided along either side of the furnace a longitudinal support beam 85 affixed to posts 86 carried at spaced intervals therealong upon the floor 26. As best seen in FIG. 4, angle members 87 affixed to the support beams as by lag bolts 88 have upstanding legs 89 serving as support plates for the rollers.

More particularly, the support plates are provided at spaced intervals therealong with oppositely disposed pairs of upwardly opening semi-circular recesses 90. The collars of bearings 91 upon the drive axles and mounting shafts 83 and 84, respectively, are received within the recesses 90 for supporting the rolls. Snap retaining rings 92 on the bearing collars are adapted for reception in corresponding retaining ring recesses or grooves 93 formed around the recesses 90 at the inwardly directed faces of the support plates 89. Bearing retainer plates 94 positioned along the face of the support plates and retainer rings restrain the bearing collars against lateral movement, while permitting the rollers and bearings thereon to be lifted from the support plates. Central sleeves 95 of the bearings on the drive axles 83 are affixed to the drive axle as by a set screw 96 to restrain the roller against axial movement. The sleeves 95 of the bearings on the mounting shafts 84, on the other hand, are free to move axially along the shafts to accommodate axial expansion and contraction of the rollers.

It is highly desirable that the rollers throughout the length of the furnace be driven in a positive manner at a known predetermined speed in order to minimize damage to the heated glass sheets as they are conveyed through the furnace. At the same time, it is imperative that the individual rollers be capable of being quickly and easily disengaged from the drive system, and that the drive system not interfere with removal and replacement of individual rollers. To that end, the conveyor 16 is provided with a drive system, identified generally at 97, whereby the rollers are driven in groups in a positive, timed manner. More particularly, there is affixed to the drive axle 83 of each roller 79 a toothed sprocket or drive wheel 98. The upper flight of a timing belt 99 extends over a series or group of the sprockets, the belt having a correspondingly toothed surface adapted to matingly engage the teeth of the sprockets 98. The belt is entrained about first idler pulleys 100 affixed to the support beam 85 beneath the end ones of the group of toothed sprockets 98, and then over second idler pulleys 101 carried by the beam 85 and around a toothed drive sprocket 102 of a right angle gear drive unit 103 affixed to the beam.

One or both of the second idler pulleys 101 may be utilized as adjustable belt tighteners by mounting them in a conventional manner for selective positioning as by being carried by a spring loaded arm (not shown) or otherwise located at different positions along the beam 85. Any number of rollers 79 may be driven by each of the belts 99, the number generally being limited by the lengths and types of belts which are readily available. In modular furnaces of the type envisioned by the invention, the number will generally be some particular portion, such as one half or one fourth, of the total number of rollers of a module. In the embodiment of FIG. 3, for example, the belt 99 drives eighteen of the rollers 79.

In accordance with an important aspect of the invention, there is provided along the drive side of the furnace a series of readily removable hold-down assemblies, identified generally at 104 (FIGS. 3 and 4), for maintaining the timing belt 99 in driving engagement with each of the toothed sprockets 98 while enabling the sprockets to be quickly and simply disengaged from the belt for removal and replacement of individual rollers 79. Each individual hold down assembly comprises an elongated side plate 105 to which is affixed a pair of spaced mounting blocks 106. Threaded shafts 107 projecting downwardly from the mounting blocks extend axially through tubular receptacles 108 carried by brackets 109 affixed to the angle members 87. The hold down assemblies are secured in place as by hand wheels 110 threadedly received on the shafts 107 and urging the mounting blocks 106 downwardly against the tubular receptacles 108. Handles 111 are provided on the mounting blocks for manually installing and removing the hold-down assemblies.

A plurality of freely rotatable cam rollers 112 are carried by the side plate 105 at spaced positions therealong on axles 113 affixed to the side plate as by mounting bolts 114. The cam rollers are positioned to rollingly engage the upper surface of the belt 99, with one cam roller intermediate each adjacent pair of the toothed sprocket or drive wheels 98 to depress the belt between the drive wheels and insure that the teeth on the timing belt will be continuously intermeshed with the teeth of the drive wheels. A shield plate 115 affixed to the side plate 105 extends over the line of cam rollers as a safety measure and to prevent any glass which may shatter while on the rollers from flying into the belt and sprocket drive mechanism. The hold down assemblies 104 are positioned end to end along the furnace so that one of the cam rollers is positioned between each pair of adjacent toothed sprockets 98, and are of such length as to be readily installed and/or removed by one person. Thus, as shown in FIG. 3, two such assemblies may advantageously be employed with each segment of rollers driven by a single timing belt 99.

Although separate power units may be provided for driving each of the gear drive units 103, all or any number of the drive units may advantageously be driven by a common power unit. In the preferred embodiment of FIG. 1, for example, all of the rollers from the entrance end of the furnace up to the final section, where the sheets are transferred to the press bending apparatus, are driven by a single conveyor drive unit 116. The final section is driven by a separate transfer section drive unit 117 so that it may be appropriately cycled to accelerate movement of the heated sheets into the press bending apparatus.

The drive unit 116 includes a motor 118 connected to a gear reduction unit 119 having an output shaft and sprocket 120. The output sprocket is coupled by means of a drive chain or belt 121 to a sprocket 122 on a line shaft 123 rotatably journalled in bearings 124 affixed to the support posts 86. The line shaft extends along the furnace and has affixed at appropriate locations therealong, sprocket wheels 125. The sprocket wheels are connected by drive chains or belts 126 to drive sprockets 127 on the input shafts 128 of the right angle gear drive units 103. Thus, the entire body of rollers up to the transfer section is driven in a timed manner by the drive unit 116.

As explained above and as will be seen in FIG. 1, the final or transfer section of the rollers is driven independently from the remainder of the rollers by the transfer section drive unit 117. The drive unit more specifically comprises a gear box 129 having a toothed drive sprocket 130 which drivingly engages the timing belt 99. The gear box is driven as by a variable speed motor 131 having suitable conventional controls (not shown) whereby the rollers of the transfer section can be so operated as to expeditiously advance heated glass sheets from the furnace into the press bending apparatus.

Provision is made for enclosing the side area of the furnace around the rollers 79 and between the upper and lower enclosure sections to isolate the furnace interior from the ambient external atmosphere. In order to do so while permitting the rollers to be readily removed and replaced, as best seen in FIG. 2 a lower roll packing member 132 is disposed atop each side wall of the lower enclosure section to enclose, in conjunction with cooperating upper roll packing members 133, the area between and around the individual rollers.

Figure 6:
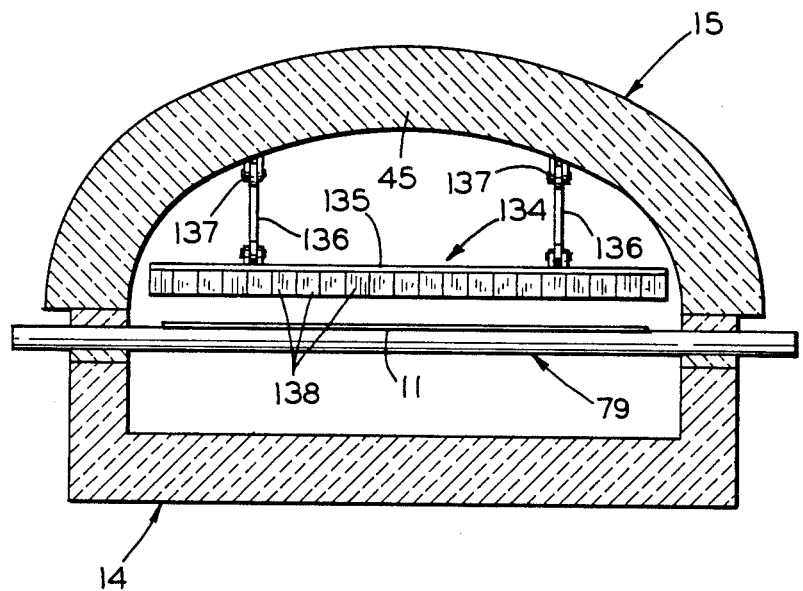
FIG 6 is a view similar to FIG 5, illustrating a differential heating assembly within the furnace enclosure.

As hereinabove described, the furnace construction in accordance with the invention is such, due to the novel elliptical configuration of the cap 45, as to facilitate differential heating of the sheets by means of the heating elements associated with the cap. Should it be necessary or desirable to modify the differential heating capability of the furnace beyond that which can be achieved with the basic structure, or to supplement the heating in certain areas, it is contemplated that additional differential heating means may be provided. Thus, as shown in FIG. 6 there is provided beneath the cap 45 and over the path of the glass sheets 11 on the rollers 79, a supplemental differential heating assembly, identified generally at 134. Such a differential heating assembly is disclosed and described in detail in copending application Ser. No. 07/355,169, filed May 22, 1989, which disclosure is incorporated herein by reference and to which reference may be had for a full understanding of the device. Briefly, and as shown in FIG. 6, the supplemental heating assembly may be provided at selected locations along the length of the furnace, and generally comprises carrier members 135 extending transversely within the upper enclosure section 15 suspended relatively closely above the path of the glass sheets as by hangers 136 affixed to brackets 137 in the furnace cap. Longitudinally extending heating elements 138 carried by the members 135 face the glass sheets to provide radiant heat thereto. The heating elements may be controlled individually to provide heat in selected amounts and thereby create a predetermined modified heating pattern across the furnace.

It is to be understood that the forms of the invention herein shown and described are to be taken as preferred embodiments only of the same, and that various changes in the size, shape and arrangement of parts, as well as various procedural changes may be made without departing from the spirit of the invention or the scope of the following claims.

What is claimed is:

1. A furnace for heating glass sheets comprising, an upper furnace enclosure section and a lower furnace enclosure section together defining an elongated, generally horizontally extending heating chamber, conveyor means including a plurality of rollers disposed in spaced aligned relation throughout the length of said heating chamber for carrying glass sheets into and through said heating chamber, and means for rotatably supporting said rollers at their opposite ends outside said heating chamber, said upper furnace enclosure section including a cap having an interior surface facing said rollers and glass sheets conveyed thereon, said interior surface of said cap being elliptical in transverse section, and a plurality of heating means associated with said interior surface of said cap within said upper enclosure section for providing heat whereby said sheets may be differentially heated across said furnace as they are carried therethrough.

2. A furnace for heating glass sheets as claimed in claim 1, including a framework for supporting said upper furnace enclosure section independently from said lower furnace enclosure section and said rollers, and jack means connecting said upper furnace enclosure section to said framework for selectively raising and lowering said upper furnace enclosure section relative to said rollers.

3. A furnace for heating glass sheets as claimed in claim 1, wherein said elliptical interior surface of said cap includes an intermediate segment having a first radius of curvature, said intermediate segment being flanked by side segments having a second radius of curvature smaller than said first radius.

4. A furnace for heating glass sheets as claimed in claim 3, wherein the length of said first radius of curvature is at least 1.5 times that of said second radius of curvature.

5. A furnace for heating glass sheets as claimed in claim 4, wherein the interior width of said cap is about 84 inches (2134 mm), the midpoint of said cap with said upper enclosure section in its operating position is about 30 inches (762 mm) above the tops of said rollers, said first radius is about 64.4 inches (1636 mm) and said second radius is about 18.5 inches (470 mm).

6. A furnace for heating glass sheets as claimed in claim 1, wherein said cap comprises a cast silica arch.

7. A furnace for heating glass sheets as claimed in claim 1, wherein said heating means comprises a plurality of elongated electric resistance heating elements extending longitudinally along said interior surface in spaced relation to one another, said heating elements following the contour of said interior surface.

8. A furnace for heating glass sheets as claimed in claim 7, including a plurality of spaced, longitudinally extending recesses in said surface of said cap, said recesses having throat sections of reduced width and said heating elements comprising strip members disposed in said recesses.

9. A furnace for heating glass sheets as claimed in claim 2, wherein said upper furnace enclosure comprises an outer shell, a plurality of rib sections affixed to said outer shell at spaced intervals therealong, and a support member extending longitudinally along each lower edge of said upper furnace enclosure, said cap comprising a cast refractory arch carried at its ends on said longitudinal support members.

10. A furnace for heating glass sheets as claimed in claim 9, including packing members disposed beneath each side edge of said upper furnace enclosure and between said rollers for enclosing the area between said upper and lower furnace enclosure sections and around said rollers with said upper furnace enclosure section in its lowered, operative position.

11. A furnace for heating glass sheets as claimed in claim 9, wherein said upper furnace enclosure section includes pairs of columns on opposite sides of said heating chamber at spaced locations therealong, cross beams extending transversely above said upper enclosure section and carried at their ends upon said pairs of columns, said jack means comprising at least one screw jack carried by each said cross beam, each said screw jack including a lift rod connected to said outer shell for carrying said upper enclosure section.

12. A furnace for heating glass sheets as claimed in claim 11, including drive means connected to a plurality of said screw jacks for selectively operating said plurality of jacks in unison for vertically raising and lowering said upper enclosure section.

13. A furnace for heating glass sheets as claimed in claim 12, in which said drive means comprises a rotatably mounted countershaft extending longitudinally along said framework, a gear reduction unit coupled to said countershaft and operable to selectively rotate said countershaft in either direction, and means coupling each of said plurality of jacks to said countershaft for simultaneous operation by said countershaft.

14. A furnace for heating glass sheets as claimed in claim 1, wherein said conveyor means includes an upstanding roller support plate extending along each side of and outside said heating chamber, said support plates having pairs of upwardly opening recesses at spaced intervals therealong, each said roller comprising a cylindrical sheet-carrying intermediate section having a shaft extending axially from each end thereof, a bearing collar rotatably mounted on each said shaft, said bearing collars being adapted for reception in a said pair of said upwardly opening recesses for rotatably mounting said roller, a drive wheel affixed to said shaft at one end of each said roller, drive belt means extending over the top of a plurality of said drive wheels in driving engagement therewith, and a drive system operatively associated with said drive belt means for driving said drive belt and simultaneously rotating said plurality of drive wheels and rollers.

15. A furnace for heating glass sheets as claimed in claim 14, including a removable hold down assembly, said hold down assembly comprising cam rollers positioned to rollingly engage the upper surface of said drive belt between adjacent ones of said drive wheels to depress said drive belt and urge it downwardly into driving engagement with said drive wheels.

16. A furnace for heating glass sheets as claimed in claim 15, wherein said drive wheels have toothed peripheries and said belt is a timing belt having teeth adapted to mate with said toothed peripheries of said drive wheels.

17. A furnace for heating glass sheets as claimed in claim 14, including a retaining ring surrounding each said bearing collar, enlarged recesses in one face of said support plates around said upwardly opening recesses for receiving said retaining rings, and bearing retainer plates extending along said one face confining said retaining rings within said recesses whereby said bearing collars are restrained against lateral movement.

18. A furnace for heating glass sheets as claimed in claim 17, wherein said bearing collars at the ends of said rollers having said drive wheels are secured against axial movement along said shafts, and said bearing collars at the opposite ends of said rollers are free to move axially along said shafts for accommodating expansion and contraction of said rollers.

19. A furnace for heating glass sheets as claimed in claim 14, including a plurality of separate said drive belt means, each in driving engagement with a plurality of said drive wheels, said drive system comprising an individual drive unit for each said separate drive belt means, a rotatably mounted line shaft extending longitudinally along said heating chamber, means for rotatably driving said line shaft, and means operably coupling each said individual drive unit to said line shaft whereby said individual drive units are driven in unison by said line shaft.

20. A furnace for heating glass sheets as claimed in claim 19, wherein said furnace includes an exit end through which heated glass sheets are discharged for subsequent processing, said conveyor means further including a transfer section at said exit end, said transfer section comprising an additional said drive belt means in driving engagement with a plurality of said drive wheels, and a transfer section drive unit operable to drive said additional belt means independently from said plurality of drive belt means for operating said rollers of said transfer section at selected speeds different from those ahead of said transfer section.

21. A method of heating glass sheets according to a desired non-uniform pattern across their width as said sheets are conveyed through an elongated enclosed heating furnace upon aligned roller members comprising, providing a refractory cap over said rollers and said glass sheets conveyed thereon having a profile which is curved from one side edge to the other, matching said profile to said desired heating pattern whereby the degree of curvature of said cap is greater opposite areas across said sheets to be heated to higher temperatures than opposite areas where less heating is desired, and supplying radiant heat along said profile from said cap to said sheets.

22. A method of heating glass sheets according to a desired non-uniform pattern across their width as claimed in claim 21, wherein said profile is elliptical in form.

23. A method of heating glass sheets according to a desired non-uniform pattern across their width as claimed in claim 22, including the step of applying additional radiant heat to said sheets in selected amounts across said furnace below said cap to modify the heating pattern established by supplying radiant heat along said profile.

* * * * *